(12) United States Patent
Rognon et al.

(10) Patent No.: US 9,980,596 B2
(45) Date of Patent: May 29, 2018

(54) METHOD FOR PROVIDING INFORMATION TO A USER FROM A CAPSULE FOR THE PREPARATION OF A BEVERAGE USING A CODE

(75) Inventors: Vincent Rognon, Essertines-sur-Yverdon (CH); Yann Epars, Penthalaz (CH); Jean-Luc Denisart, Cully (CH)

(73) Assignee: Nestec S.A., Vevey (CH)

( * ) Notice: Subject to any disclaimer, the term of this patent is extended or adjusted under 35 U.S.C. 154(b) by 0 days. days.

(21) Appl. No.: 13/522,537

(22) PCT Filed: Jan. 12, 2011

(86) PCT No.: PCT/EP2011/050323
§ 371 (c)(1),
(2), (4) Date: Jul. 17, 2012

(87) PCT Pub. No.: WO2011/089049
PCT Pub. Date: Jul. 28, 2011

(65) Prior Publication Data
US 2012/0295234 A1 Nov. 22, 2012

(30) Foreign Application Priority Data
Jan. 19, 2010 (EP) .................................. 10151020

(51) Int. Cl.
*A47J 31/40* (2006.01)
*A47J 31/00* (2006.01)
(Continued)

(52) U.S. Cl.
CPC ....... *A47J 31/3623* (2013.01); *A47J 31/4492* (2013.01); *B65D 85/8043* (2013.01); *B65D 2203/06* (2013.01)

(58) Field of Classification Search
CPC .............................. A47J 31/4492; A47J 31/36
(Continued)

(56) References Cited

U.S. PATENT DOCUMENTS 5,072,660 A * 12/1991 Helbling ......................... 99/280
5,158,793 A * 10/1992 Helbling ....................... 426/231
(Continued)

FOREIGN PATENT DOCUMENTS

EP 1387560 2/2004
EP 1440640 7/2004
(Continued)

OTHER PUBLICATIONS

Marshall, David. Autocoding 2D Barcodes:Specification, Olympus Automation Limited, Revison 4.0, (2012) Retrieved from https://dl.dropboxusercontent.com/u/159171554/Food%20Industry%202D%20Barcode%20Specification.pdf.*
(Continued)

*Primary Examiner* — Dana Ross
*Assistant Examiner* — Lawrence Samuels
(74) *Attorney, Agent, or Firm* — K&L Gates LLP (57) ABSTRACT

Method for providing information to a user from a capsule for the preparation of a beverage in a beverage producing device (20) comprising a capsule with a two-dimensional barcode (7) thereon, capturing at least one image of the barcode via a digital camera (42) and displaying decode information from said image on a display (41).

17 Claims, 9 Drawing Sheets (51) Int. Cl.
*A47J 31/36* (2006.01)
*A47J 31/44* (2006.01)
*B65D 85/804* (2006.01)

(58) Field of Classification Search
USPC ... 99/280, 281, 282, 283, 289 R, 295, 302 R
See application file for complete search history.

(56) References Cited

U.S. PATENT DOCUMENTS

| | | | | |
|---|---|---|---|---|
| 6,820,535 | B2* | 11/2004 | Fischer | 99/289 R |
| 7,258,061 | B2* | 8/2007 | Campbell et al. | 99/283 |
| 7,335,387 | B2* | 2/2008 | Hayes et al. | 426/433 |
| 7,389,919 | B2* | 6/2008 | Walker et al. | 235/383 |
| 7,444,925 | B2* | 11/2008 | Mahlich | 99/289 P |
| 7,513,412 | B2* | 4/2009 | Benedetti et al. | 235/375 |
| 7,568,629 | B2* | 8/2009 | Lapstun et al. | 235/462.45 |
| 7,673,558 | B2* | 3/2010 | Panesar et al. | 99/295 |
| 7,987,767 | B2* | 8/2011 | Hester et al. | 99/280 |
| 8,210,396 | B2* | 7/2012 | Girard et al. | 222/129.1 |
| 2002/0048621 | A1* | 4/2002 | Boyd | A47J 31/3623 426/77 |
| 2003/0072489 | A1* | 4/2003 | Reichenbach et al. | 382/181 |
| 2004/0016814 | A1 | 1/2004 | Muramatsu | |
| 2004/0089158 | A1* | 5/2004 | Mahlich | 99/275 |
| 2004/0112222 | A1* | 6/2004 | Fischer | 99/279 |
| 2004/0197444 | A1* | 10/2004 | Halliday et al. | 426/112 |
| 2006/0000851 | A1* | 1/2006 | Girard | A47J 31/407 222/129.1 |
| 2008/0187638 | A1* | 8/2008 | Hansen | 426/433 |
| 2008/0302251 | A1* | 12/2008 | Rijskamp | A47J 31/407 99/295 |
| 2009/0219140 | A1* | 9/2009 | Guard | A47J 31/4492 340/10.1 |
| 2010/0078480 | A1* | 4/2010 | Aker | 235/462.08 |

FOREIGN PATENT DOCUMENTS

| | | |
|---|---|---|
| EP | 1472156 | 11/2004 |
| EP | 1593329 | 11/2005 |
| EP | 1959374 A1 | 8/2008 |
| EP | 2085000 | 8/2009 |
| EP | 1715778 | 10/2010 |
| EP | 2525692 | 11/2012 |
| JP | 2004525829 | 8/2004 |
| JP | 2005102232 | 4/2005 |
| JP | 2009183700 | 8/2009 |
| WO | 0228241 | 4/2002 |
| WO | 02074144 | 9/2002 |
| WO | 02078498 | 10/2002 |
| WO | 2007107533 | 9/2007 |
| WO | 2009007292 | 1/2009 |

OTHER PUBLICATIONS

PCT Written Opinion of the International Searching Authority for Application No. PCT/EP2011/050323 dated Mar. 14, 2011. 3 Pages.
Mexican Office Action in MX/a/2012/008249 dated May 16, 2014, 2 pages.
English Translation of Korean Office Action for Appl No. 10-2012-7021660 dated Feb. 6, 2017.
Korean Office Action for Appl No. 10-2012-7021660 dated Feb. 6, 2017.
English Translation of Korean Office Action for Appl No. 10-2012-7021660 dated Sep. 27, 2017.
Korean Office Action for Appl No. 10-2012-7021660 dated Sep. 27, 2017.
English Translation of Notice of Ruling to Reject Amendment for Korean Appl No. 10-2012-7021660 dated Sep. 27, 2017.
Notice of Ruling to Reject Amendment for Korean Appl No. 10-2012-7021660 dated Sep. 27, 2017.

* cited by examiner

METHOD FOR PROVIDING INFORMATION TO A USER FROM A CAPSULE FOR THE PREPARATION OF A BEVERAGE USING A CODE

CROSS REFERENCE TO RELATED APPLICATIONS

The present application is a National Stage of International Application No. PCT/EP2011/050323, filed on Jan. 12, 2011, which claims priority to European Patent Application No. 10151020.4, filed on Jan. 19, 2010, the entire contents of which are being incorporated herein by reference.

FIELD OF THE INVENTION

The invention relates to a method for providing information to a user from a capsule for the preparation of a beverage in beverage dispensing device using a code such as an identification code on the capsule.

BACKGROUND

It has been previously proposed capsule systems comprising an identification code for setting parameters in a beverage production machine. For example, capsules or cartridges containing coffee, milk, chocolate, tea or combinations of these ingredients are used in specifically designed machines in which water is fed under pressure in the capsule which interacts with the ingredients for preparing a beverage. Such machines may operate at different pressures.

WO02/28241 describes a cartridge for the preparation of hot or cold beverages wherein the packet includes a machine interpretable feature which may be interpreted to direct the beverage producing device to employ specific brewing operation suitable for the particular brewing packet.

WO02/074144 describes a beverage brewing system comprising a beverage brewing device recognition system allowing the beverage brewing system to recognize the presence, type and/or capabilities of the beverage brewing device inserted in the system.

In WO02/078498, a machine-readable identifier on a portion package, which contains ground coffee, for espresso machines is provided in a rotationally symmetrical manner, whereby permitting it to be easily and reliably read, on essentially a flat surface of the portion package. The portion package is preferably a portion of the capsule with an essentially round bottom to which the identifier is coaxially applied. A problem lies in that reading of the code requires the capsule to be read over a large path of movement which forces the capsule to be moved for carrying out the reading. Furthermore, the surface onto which the code is printed is not typically flat but rather convex due to the pressure of internal gas in the capsule. As a result, the code can be distorted and its reading negatively affected. Finally, the code contains a too limited number of information thereby making this solution not very attractive.

In order to solve the problems of code printed on flexible surfaces, such as in WO02/078498, attempts have been made to flatten the surface by mechanical elements of the device such as in EP1593329. However, such a method may cause the rupture of the capsule and will cause mechanical frictions in the device which are not desirable or even accidental tearing of the package.

EP1440640 describes a method of preparing at least one range of beverages comprising different steps including the insertion of at least one beverage cartridge, operating a user interface to initiate an operating cycle, creating a specific brewing cycle based on a traditional barcode, passing aqueous medium through the beverage cartridge to produce a beverage wherein the temperature, pre-wet, volume flow rate and air purge of the aqueous medium is set based on the code, providing eductor means in certain cartridge to provide foaming of the beverage.

Solutions have also consisted in replacing the optical code by a radio-frequency code such as in EP1715778. However, this technology remains expensive for disposable containers such as beverage capsules.

WO 2009007292 describes a method of a reading device in a drinks preparation apparatus for recording an image of a one-dimensional or multidimensional pattern on a drinks or service disc which is inserted into an open brewing chamber of the apparatus and, before the start of the preparation or service operation, is changed from a loading position to a closure position via intermediate positions in a closing operation of the brewing chamber. It is developed by virtue of the fact that the reading apparatus is activated before the brewing chamber is closed, with the result that at least one image of the pattern is recorded before the closure position is reached. The problem here comes from the complexity of the image processing, in particular, the comparison of several images which is necessary.

In general, the systems of the prior art suffer the problem of limited communication with the device and/or user. In the prior art, the code is essentially used for setting brewing parameters of the beverage producing device. There is a need for improving communication both during and out of beverage preparation.

Furthermore, the prior art also suffers the problem of a reliable reading of the identification code of the capsule. Attempts have been made to improve the identification but most of the solutions are complicated to implement and/or provide other problems.

Generally, the capsule must be oriented or inserted in the beverage device in a precise manner to ensure the correct reading of an optical barcode in the machine. For example, in EP1440640, the capsule must be placed in a single precise orientation in the capsule holder to allow reading by capsule recognition means (see FIG. 40). Therefore, there are clear limitations to the possible automation of the beverage producing device, in particular, if several capsules needs to be read sequentially in the device.

SUMMARY OF THE INVENTION

The present invention alleviates the problems of the prior art system by providing a simple, reliable and economical solution for identifying the capsule, communicate information and set parameters that can also be implemented in any beverage producing device, including in a high throughput automated device, in which it is essential to reliably identify capsules inserted therein, such as when preparing multi-component beverages from several capsules. The invention also provides solutions for improving communication with the user during and/or outside the periods of preparation of the beverage.

The invention further relates to a method for providing information to a user from a capsule for the preparation of a beverage in a beverage producing device comprising providing a capsule with a two-dimensional barcode thereon, capturing at least one image of the barcode via a digital camera and displaying decoded information from said image on a display.

In particular, the digital camera can be part of the beverage producing device. In another mode, the decoded information is configured to be displayable on a digital camera of a portable telecommunication terminal. For this, one or more programs are provided in the portable terminal enabling decoded information from the code to be displayed in a comprehensive form for the user on the display.

The displayed information includes direct information and/or a web address. As direct information, it is meant essentially information obtainable directly from data contained in the barcode such as product information, brewing parameters or user's instructions.

In the proposed method, an operation may consist in selecting data from the set of data contained in the code before displaying said information.

In a possible mode, the displayed information is an image of the code. In this case, the image is preferably obtained from a digital camera of the beverage producing device. The image of the code can then be captured by a second digital camera, preferably, from a portable telecommunication terminal.

The method may also comprise displaying information prompting the user to follow instructions relevant to the beverage preparation. In particular, the instructions comprise inserting a capsule in the beverage producing device and/or waiting for the delivery of a beverage component.

In the method of the invention, the displayed decoded information may include information prompting the user to access a website or automatically directing him/her to a website.

In the proposed method, the capsule preferably comprises a two-dimensional barcode, preferably, in a central location of a sealing membrane.

More particularly, the capsule of the invention comprises:
  a body comprising at least one compartment for receiving said beverage ingredients and a flange-like rim extending outwardly and transversally to a central axis (I) of said body;
  a membrane for closing the opening which is sealed onto the flange-like rim,
  an optical code containing binary information configured to be read by a camera of a beverage producing device,
  wherein the optical code is a two-dimensional barcode having rectilinear borders and which is inscribed in a circular area concentric relative to the centre (O) of the membrane having a radius smaller than the radius of the membrane.

The capsule of the invention provides several advantages.

First of all, the capsule no longer requires to be specifically inserted in a predetermined orientation in the capsule holder or charger to ensure proper detection. A degree of freedom is given as to the orientation of the capsule relative to its central axis. This greatly facilitates the insertion of the capsule in the device.

Secondly, in particular due to its small size, the code can be identified without flattening the package and without necessarily moving the device relative to the capsule (or vice versa) for reading the code. Therefore, the code can be read while the capsule is in a static position thereby rendering the device simpler and more reliable. Furthermore, the visual properties of the capsule such as the brand, colour, labelling, etc, are not affected so much as compared to prior art solutions.

Thirdly, the two-dimensional code contains more information than typical optical code thereby offering a wider choice of parameterization and improved communication.

Preferably, the two-dimensional barcode is inscribed in a circular area of radius lower than 15 mm, preferably lower than 13 mm. As a result, reading of the capsule can be carried out while the capsule is static and the camera is placed relatively close to the capsule thus not affecting both the simplicity and compactness of the device.

Furthermore, the two-dimensional code is placed between at least one inner opaque layer and an outer transparent layer of the membrane. As a result, the code is protected against the external physical and/or chemical attacks but also provide a sufficient contrast to be read despite its small size.

The two-dimensional barcode comprises information in binary format including: product information, authentication data, brewing parameter settings, URL and combinations thereof.

The capsule system of the invention for preparing a beverage from the capsule comprises:
  a beverage producing device comprising capsule handling means including a capsule-holder for receiving the capsule therein and identification and control means,
  wherein the identification and control means comprises a digital camera positioned relative to the handling means and configured for capturing an image of the two-dimensional code placed on the capsule and transferring said image or binary information related thereof to a control unit of the identification and control means.

The said means for identification and control means can comprise a display configured for displaying product information in decoded form from said image or binary information.

In a preferred mode, the system comprises a range of capsules corresponding to different beverage families (e.g., espresso, lungo, latte macchiato, cappuccino, etc.). For at least two capsules of the range, the code of each capsule is of a different matricial size which is adapted for coding information related to its beverage family. The camera of the device is thereby also configured to read barcodes of at least two different matricial sizes to identify to which beverage family the identified capsule belongs to.

In a particular mode, the code for the at least two capsules can comprise a number of bits that varies according to the number of characters of the name of the beverage.

BRIEF DESCRIPTION OF DRAWINGS

Additional characteristics and advantages of the present invention will be detailed in the description of the drawings that follows.

DETAILED DESCRIPTION OF THE INVENTION

The invention relates to a capsule containing beverage ingredients for the preparation of a beverage, by injection of liquid in the capsule and interaction of the liquid with these ingredients. The beverage ingredients comprise: roast and ground coffee, instant coffee, leaf tea, instant tea, cocoa, dairy or non-dairy creamer, chicories, fruit or vegetable extract, culinary extract and combinations thereof. Additives may also be added in suitable amounts such as sweeteners, flavouring agents, thickeners, edible carriers, dyes, foaming agents, stabilizers, buffers, emulsifiers, processing aids and combinations thereof. The term "capsule" refers in general to any single-use beverage package that can be rigid, semi-rigid, sometimes even flexible, including cartridges, pods or pads, sachets, etc., used in a beverage producing machine by injection of a liquid, usually water, under pressure and at a certain temperature (hot, cold or ambient), for interaction with ingredients contained in the package and for delivery from the package of a liquid or partially liquid product (i.e., the beverage). The interaction between the liquid and the ingredients may happen by extraction, dissolution, dilution, infusion, dispersion, mixing, emulsification and combinations thereof.

Figure 1:
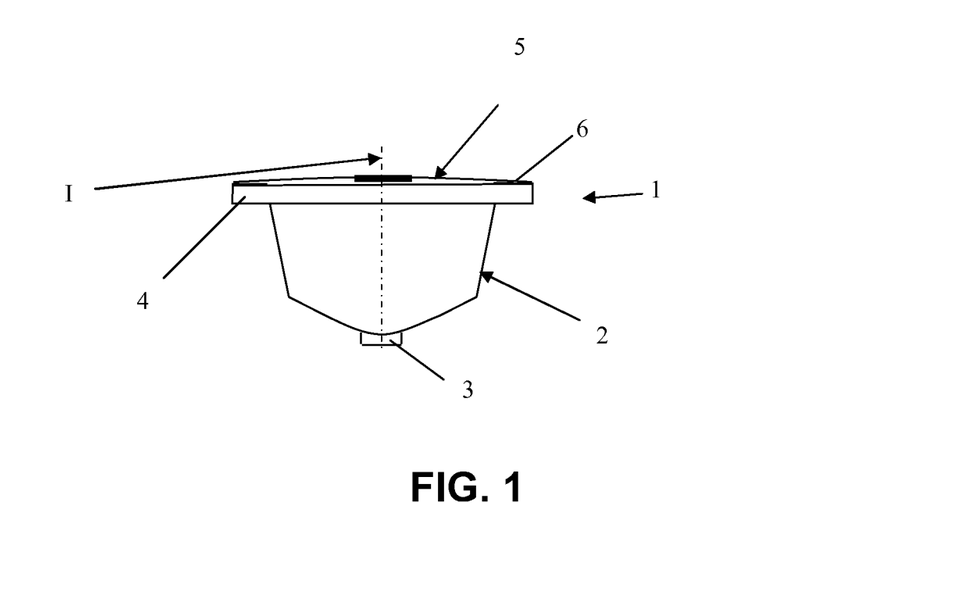
FIG. 1 shows a side view of a capsule of the invention.

The capsule 1 typically comprises a body 2 comprising at least one internal compartment for receiving the beverage ingredients. The body can be a form of revolution of central axis I, such as a substantially trunconical cup, with a larger side and a narrower side terminating by a delivery duct 3. At its larger side, the body comprises a flange-like rim 4 extending outwardly and transversally to the central axis I. The body is closed by a top membrane 5 sealed onto the flange like rim 4, thereby delimiting with the body, the internal compartment. Inside, the capsule may comprise means for opening a closing wall at the delivery duct, as described in patent EP1472156B1.

Figure 2:
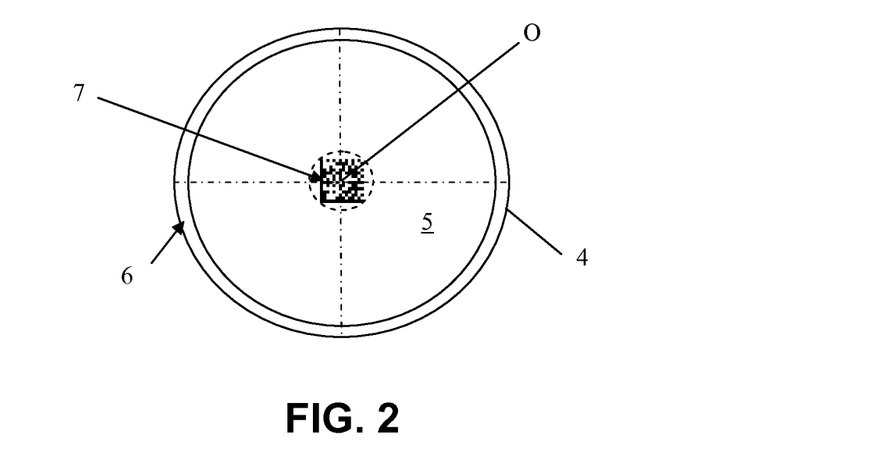
FIG. 2 shows a top view of the capsule of FIG. 1.

Referring to FIG. 2, there is illustrated a top view of the capsule of FIG. 1 showing the membrane 5 and its annular sealed portion 6 onto the flange-like rim. The membrane is not necessarily flat. Sometimes, a gas-tight membrane bulges slightly outwardly due to the internal pressure of gas (carbon dioxide, nitrogen, etc.). The membrane comprises a centre of axis "O" which represents the point of central axis "I" intersecting the membrane's surface.

As more clearly illustrated in regard to FIG. 2a, the membrane 5 comprises a DataMatrix optical code 7 containing binary information configured to be read by a camera of a beverage producing device as will be explained. The optical code is a two-dimensional barcode having rectilinear borders 7a, 7b, 7c, 7d. As known per se, the illustrated barcode is a matrix code made of small squared cells that represents bits ("0" if the cell is light and "1" if the cell is dark or vice versa). The left border 7a and bottom border 7b form an "L" shape which is known as the finder pattern and is used to locate and orient the code. The top border 7c and right border 7d represent the timing pattern which provides the count for the number of bits that determines the matricial size of the code. The encoding for such specific code is more specifically described in ISO standard, ISO/IEC 16022.

According to the invention, the optical code 7 is inscribed in a circular area 8 (illustrated by circle in dotted lines) whose centre is concentric with the centre "O" of the membrane and which has a radius "R" is smaller, preferably at least 1.5 times, most preferably at least two times smaller than the radius "$R_0$" of the membrane. By definition, the code is inscribed in the circular area 8 when none of its angles exceeds the limits of the circular area. The radius "$R_0$" represents the radius of the whole membrane including the sealed portion 6.

Figure 2A:
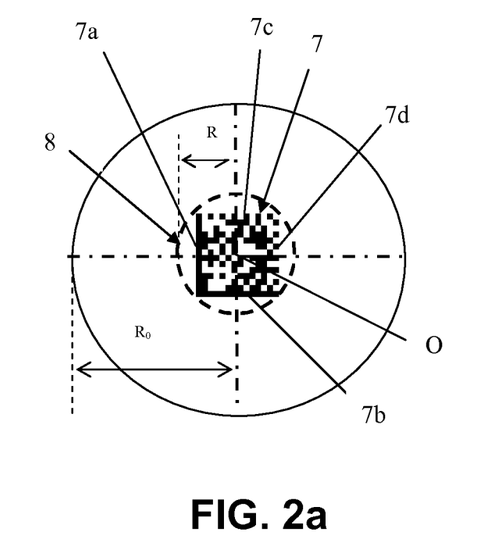
FIG. 2a shows an enlarged view of FIG. 2.

In the example of FIG. 2a, the code is formed of four borders 7a-7d of equal length making it a square with four angles which intersect the limits of the circular area (i.e., the circle in dotted line).

Figure 2B:
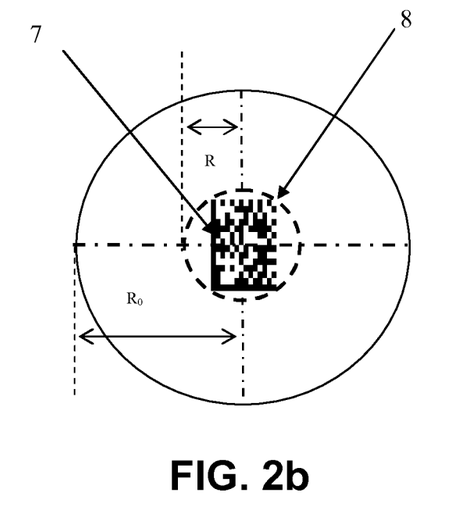
FIG. 2b shows an enlarged view of FIG. 2 according to a first variant.

In the example of FIG. 2b, the code is formed of a rectangular polygon with four angles which intersect the limit of the circular area. Thereby, the longer sides of the rectangular code intersect the limit of the circular area (i.e., the circle in dotted line).

Figure 2C:
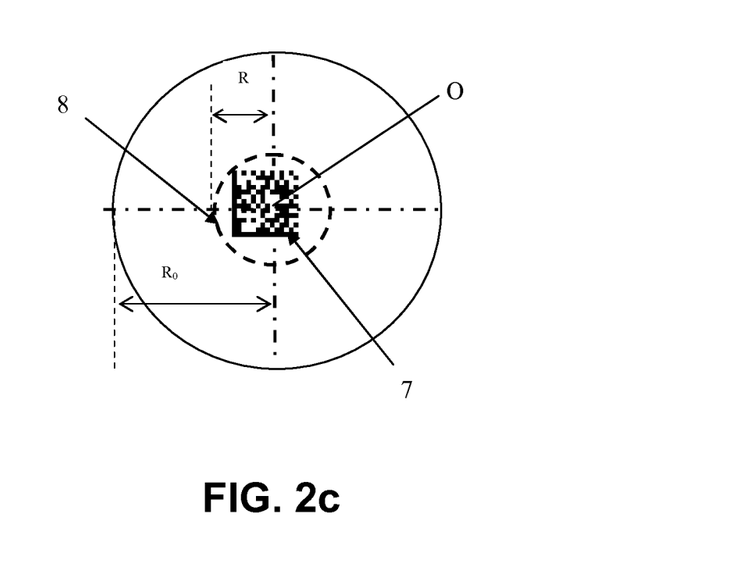
FIG. 2c shows an enlarged view of FIG. 2 according to a second variant.

In the example of FIG. 2c, the code is formed of a squared code that is off-centred relative to centre "O" but still inscribed into a circular area whose centre is concentric with centre "O" of the membrane. In particular, a single angle of the squared code intersects the limit of the circular area (i.e., the circle in dotted line).

Figure 2D:
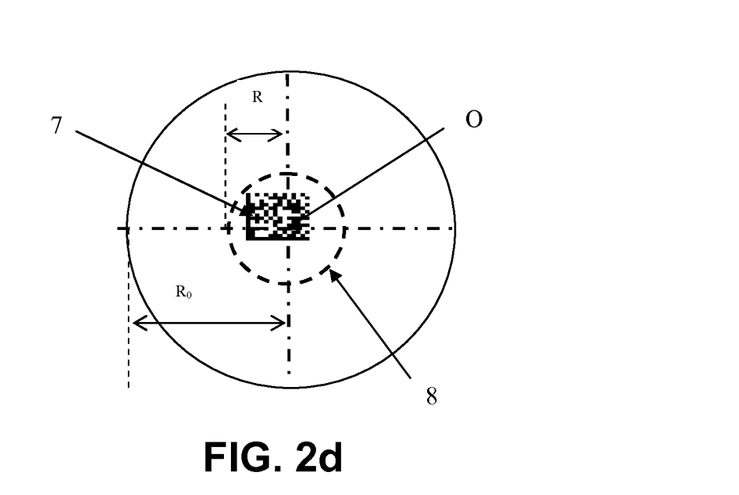
FIG. 2d shows an enlarged view of FIG. 2 according to a third variant.

In example of FIG. 2d, the code is formed of a rectangular code that is off-centred relative to centre "O" but still inscribed into a circular area whose centre is concentric with centre "O" of the membrane. In particular, a single angle of the rectangular code intersects the limit of the circular area (i.e., the circle in dotted line).

Typically, off-centring of the code occurs because the membrane is cut and sealed at elevated cadences onto the body after receiving the code, thereby centring of the membrane cannot be guaranteed during manufacturing. Typically, off-centring of the centre of the code relative to the centre O for a maximal value of about 5 mm is possible.

In all these examples, the radius "R" of the circular area 8 is much smaller than the radius "$R_0$" of the membrane. Hence, the circular area determines the limiting position zone for the code that needs to be respected for providing the advantages of the present invention, in particular, the reliable detection in all angular position of the capsule as will be explained later. The limits of the area 8 are only virtual (illustrated by the dotted lines) and it does not need to be apparent on the capsule. Preferably, the barcode is inscribed in a circular area 8, as previously defined, of radius "R" lower than 15 mm, preferably lower than 13 mm, most preferably comprised between 3 and 11 mm. In the more preferred designs, the barcode has a surface area lower than 120 mm$^2$, most preferably comprised between 20 and 90 mm$^2$. The lower limit is essentially guided by the constraints of the reading detection technology but also to the possible visual defects of the code during printing on or in the membrane.

The invention is not necessarily limited to DataMatrix code as illustrated but is applicable with any two-dimensional barcode consisting of a matrix code comprising black and white or coloured modules arranged in a square or rectangular pattern and including any of the following code standards: DataMatrix code, Semacode, Quick Response ("QR") code, Aztec code, Maxi-code or EZ-code. All of these codes use the same two dimensional principles, although using different encoding algorithms and different symbologies involving patterns of symbols such as squares, dots, circles, etc., hidden with images and combinations thereof The barcode is designed with a matricial size sufficient for storing beverage related information (i.e., "product information"), parameters relevant to the preparation of the beverage in the beverage producing device, update bits, error bits and optical reference bits. Preferably, the matricial size (i.e., number of row by number of column representing the number of bits) is comprised between 10 by 10 and 22 by 22, preferably 12 by 12 and 18 by 18.

The barcode can be an eye-naked visible pattern inserted in layers of the membrane 4 for purpose of protection against scratching, hot liquid and the like. In particular, the membrane preferably comprises at least one inner opaque layer and at least one transparent or translucent layer wherein the code is inserted between those two layers. For example, the barcode can be printed directly onto the surface of the said inner or outer layers or it can be printed onto a label that is inserted between the two layers. Preferably, the opaque layer is made of polymer selected amongst: PP, PE, PET and combinations thereof The outer layer is preferably chosen amongst PET. For example, the membrane comprises two opaque layers of PP and PET of respectively 70 and 12 microns and one outer transparent layer of PET of about 10-20 microns.

In a possible alternative, the barcode can be an invisible-to-naked-eye pattern, such as if printed with a special ink, and readable within at a specific light frequency rang such as UV. In particular, a specific invisible pattern can be used to distinguish genuine capsules from counterfeiting capsules.

For product information, information relative to the name of the beverage can be stored in the code enabling identification of the capsule. The full name of beverages can be thereby made available as a binary part of the code utilizing up to 125 bits. Other product information such as the expiry date of the capsule can be stored in the code as well using other bits of the code.

The beverage name such as an alphabetic or alphanumeric sequence ("espresso", "lungo", "cappuccino", "latte macchiato", etc.) can therefore be stored in the code in a sequence of bits. The name can then be displayed on a display 12 connected or part of the device, for example, before and/or during preparation.

In a possible mode, the 2-D barcode comprises an URL (Uniform Resource Locator) address enabling to connect the user via a display and communication means to a website, such as the website of the capsule's supplier. The communication means may be a mobile telecommunication device such as a mobile phone, PDA, etc., with digital camera function or it may be embedded in the beverage producing device. For this, the beverage producing device comprises a communication unit configured for accessing the website via an internet transmitter and an internet browser. Therefore, information services such as up-to-date commercial offers, advertisings or product information can be easily displayed or capsule ordering services (e.g., on a virtual store hosted on the website) can be offered to the user through the display.

Concerning the device setting parameters, the 2-D barcode comprises bits for storing information such as:
water temperature, e.g., hot, warm, ambient, cold temperatures,
beverage volume, e.g., 25, 40, 110, 150, 250, 500 mL, etc.,
nature of the ingredients, e.g., roast & ground coffee, soluble ingredient, herbal tea, etc.,
capsule emptying operation in particular for soluble ingredient,
capsule type, e.g., single, two-in-one, doppio, etc.,
infusing time, in particular for infusion ingredient,
a serial number for each capsule referring to a data base,
updating data and combinations thereof.

Figure 3:
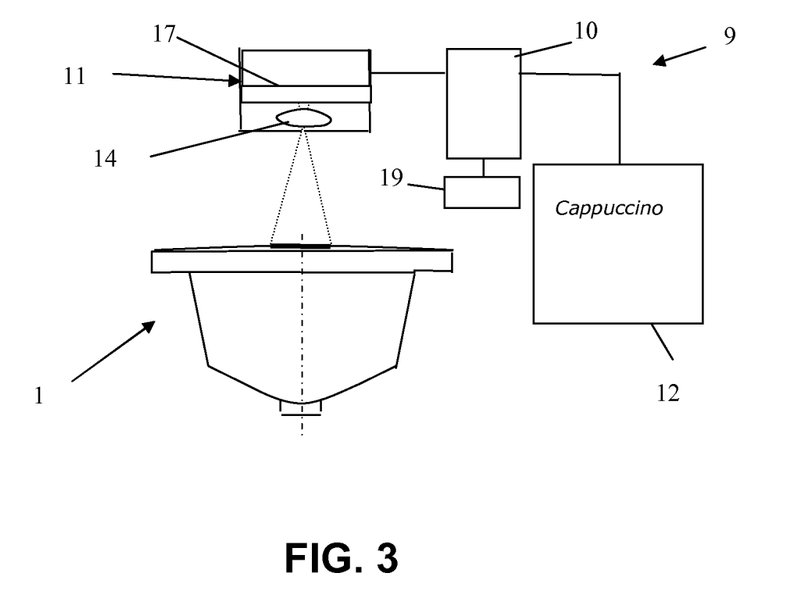
FIG. 3 illustrates a capsule in a reading mode in the device of the invention.

As illustrated in FIG. 3, the beverage producing device comprises capsule identification and control means 9 whose function is to identify, set parameters of the beverage producing device and optionally provides information and added value services to the user such as oriented access to internet. These means comprises a control unit 10, such as a central controller or several controllers, a digital camera 11, optionally, a display 12 which can be linked together or be integrated in one or several units and a communication unit 19. The control unit 10 is to be regarded in a general sense as including one or several units including processors, memories, programs and algorithms, input-output interfaces capable of running the different modules and units of the identification and control means as well as the brewing system of the device such as the heater, pumps, etc. Separate control modules may be designed to isolate the communication control from the control of the brewing system. The programs and algorithms may include decoding applications for the camera.

The control unit may further comprise a user interface for receiving inputs as to various choices for brewing parameters, beverages, internet communication, etc.

The display may, for instance, be a LCD or plasma screen, a touch-screen, or be combined to the control unit 10 and/or communication unit 19, such as in the form of a computer, a laptop, a mobile telecommunication terminal such as a mobile phone, I-pod, PDA, etc., and other equivalent communication devices. The communication unit 19 may comprise, for example, an intranet connection, a wifi and/or Bluetooth, a telecommunication modem enabling communication with an external server and/or terminal.

The camera 11 can be any input device that captures an optical image and digitalises it into an electronic image represented as binary data. The camera is designed as a digital camera typically comprising an image sensor 17 (e.g., CCD), an optical lens and aperture 14 for shaping, focusing and sharpening the image-capturing zone of the camera and a processor which may be associated to the camera 11 or be placed in the control unit. The camera may also be designed as a flutter shutter camera to be capable of taking an image of the barcode while the capsule is in movement in the device. The camera can designed as a scanner with the ability to move relative to the device when reading the barcode of the capsule. The camera can also be portable and plugged in an allocated place of the device.

Figure 4:
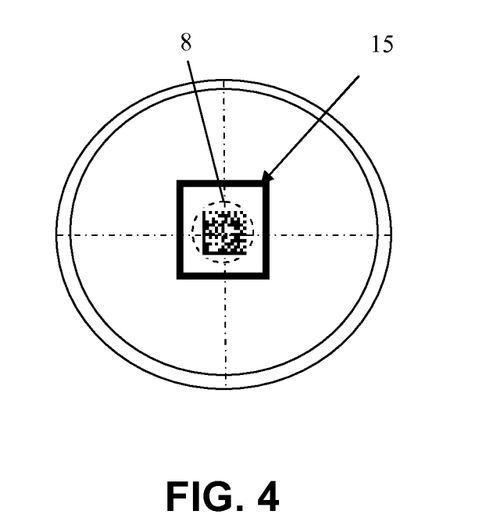
FIG. 4 shows the top of the capsule when read in a reading mode in the device of the invention.

As illustrated in FIG. 4, the camera is arranged relative to the capsule so that the image-capturing zone of the device, illustrated by rectangular zone 15, onto the membrane of the capsule, encompasses the circular area 8 into which the barcode is inscribed, as previously defined. The image-capturing zone may be from about 10 to 300% wider than the surface area of the circular area 8 and it may be any suitable polygonal zone such as rectangular, squared or circular depending on the type of camera. Preferably, the camera is configured to provide an image-capturing zone that is wide enough to capture barcode of different positions (centred or off-centred relative to "O"), of different matricial sizes and also possibly different shapes (squared or rectangular). The definition of the image-capturing zone depends on different parameters such as the characteristics of the lens and aperture, the distance between the camera and the code, the CCD and shutter characteristics, etc. In a particular application, two barcodes of different size are necessary to product information for different capsules corresponding to different beverage families (e.g., espresso, lungo, cappuccino, etc.). Larger size codes may be necessary when the name of the beverage is too long or additional instructions are required for complex beverage recipes.

Figure 5:
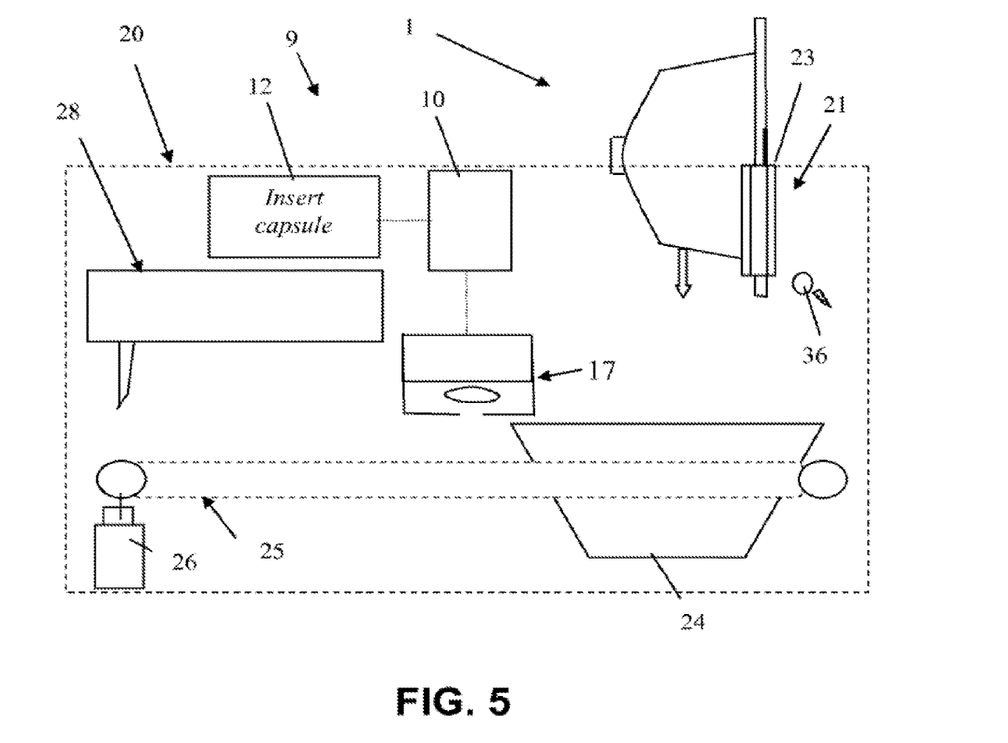
FIG. 5 illustrates a system of the invention when the capsule is in insertion mode in the device.
Figure 6:
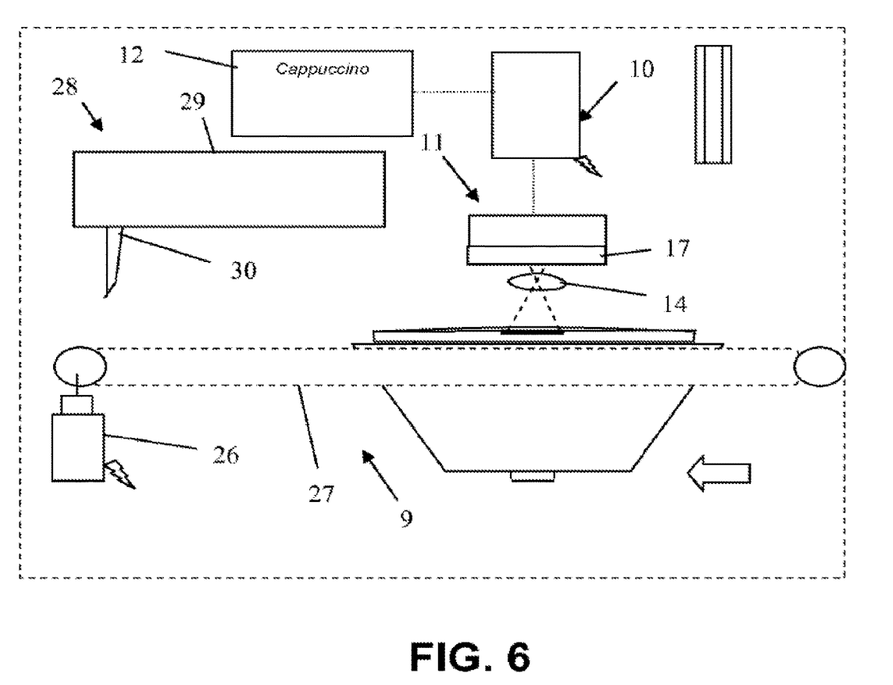
FIG. 6 illustrates the system of FIG. 5 when the capsule is in a reading mode.

The beverage producing system represented in FIG. 5 comprises a capsule 1, a beverage producing device 20 including the capsule identification and control means 9. In a preferred mode, the device 20 comprises capsule handling means 21 for enabling insertion of the capsule in the device and its transport to a liquid injection unit 22 of the device. For this, the capsule handling means comprise a gravity insertion means 23, such as a slider or charger 23, for guiding the capsule in the device by gravity into a capsule-holder 24. It should be noted that the gravity insertion means may receive the capsule while the capsule has its top membrane substantially vertical or inclined as illustrated using a "slider". Alternatively, the capsule can be substantially horizontal when dropped in the device using a tubular feeder such as described a capsule selection mechanism described in EP1593326. The capsule then falls into a capsule-holder 24 and may be recovered in a substantially horizontal position of its membrane as illustrated in FIG. 6. The capsule-holder is associated to transport means 25 which move the capsule from the insertion zone to the identification zone where the capsule is placed below the camera 11 with the barcode facing the camera a predefined distance. The transport means may comprise any suitable carrier driving the capsule holder linearly and/or rotationally. For example, the transport means comprise an electric motor 26 and linearly driving a belt 27 which supports the capsule holder. When positioned below the camera 11, the transport means may be stopped for capturing at least one image of the barcode 7 placed onto the membrane of the capsule. Alternatively, image-capturing operation can take place with a digital flutter shutter camera while the capsule-holder is moved from the insertion zone to the liquid injection zone.

After identification, the control unit activates the transport means 25 to move the capsule-holder in the liquid injection zone. In this zone, the device comprises liquid injecting means 28 comprising a closure plate 29 and a liquid injector 30 which is engaged onto the capsule such as by relative movement of the capsule-holder and closure plate 29. When engaged, the liquid injector communicates with the compartment of the capsule to enable feeding of liquid in the capsule. As known 'per se', the liquid injecting means 28 are fluidically connected to fluid supply means 31 including a water tank 32, a liquid metering means 33 (e.g., piston pump) for metering the proper volume of liquid in the capsule as a function of the identified capsule and a liquid heater 34. Typically, the liquid used for preparation of the beverage is water. The fluid supply means may further comprise a gas supply means 35 such as an air pump for emptying the capsule from residual liquid after the brewing operation. The selective activation of the supply means, in particular, the liquid metering means 33, heater 34 and gas supply means 35 is controlled by the identification and control means 9 according to the device setting parameters stored in the code.

During the different operations, the display may be controlled to prompt the user to operate different functions and/or to provide information. For example, before insertion of the capsule in the beverage producing device, the control unit prompts, via the display 12, the user to insert a capsule in the device to initiate the brewing operation (FIG. 5). A capsule presence sensor 36 of the identification and control means can verify presence of the capsule in the handling means, e.g., in the slider, tubular feeder or capsule holder. If a capsule is detected, the transport means can be activated and/or the prompt message to insert a capsule be removed from the display. It should be noted that the presence detector can also be the camera 11 when identifying the two-dimensional barcode.

As already mentioned, after capsule identification by the camera 11 (FIG. 3), product information is decoded and the control unit can command a message on the display 12 related to this product information, such as the name of the beverage and/or such decoded information can initiate a program displaying additional information contained in a memory of the control unit or information retrieved by the communication unit 19 from a remote date base. Such additional information could be commercials, nutritive information, information concerning the geographical origin of the coffee or tea ingredients, etc.

Figure 7:
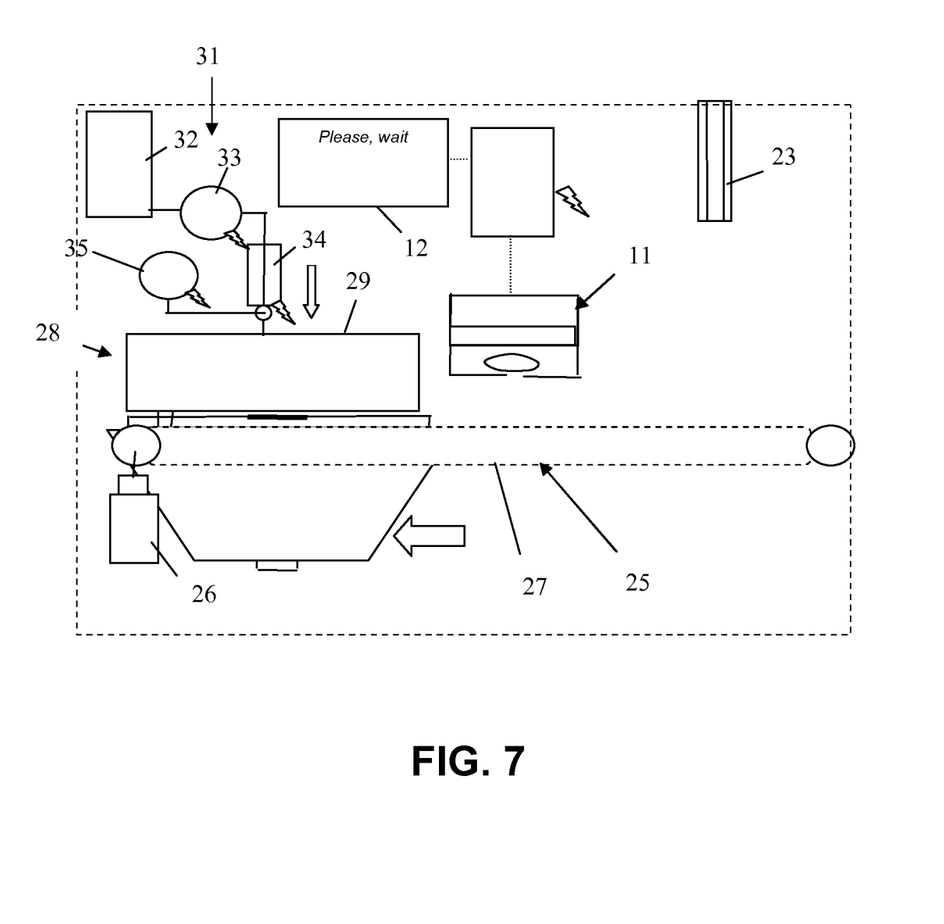
FIG. 7 illustrates the system of FIG. 5 when the capsule is in a brewing mode.

In the brewing operation (FIG. 7), further information can be displayed on the display 12 such as product information, user's instructions, brewing information, authentication data, etc. For instance, a unique serial number can be provided on each code that is compared for identification to a list of numbers stored in the memory of the control unit or on a remote server. For instance, product information displayed during or after capsule identification can be initiated at this stage only or be continued. User's instructions can be provided to prompt the user to carry out steps relevant to the brewing procedure. For instance, a prompt to wait the end of the beverage component coming out of the capsule can be provided. Also, a prompt to insert a second capsule can also be displayed, when a beverage is prepared from two or more beverage components such as cappuccino or latte macchiato necessitating more than one capsule. Brewing information can cover information as to the temperature of the beverage or of injected liquid, pressure, beverage volume, etc. This information can also be displayed at suitable time during the process.

Figure 8:
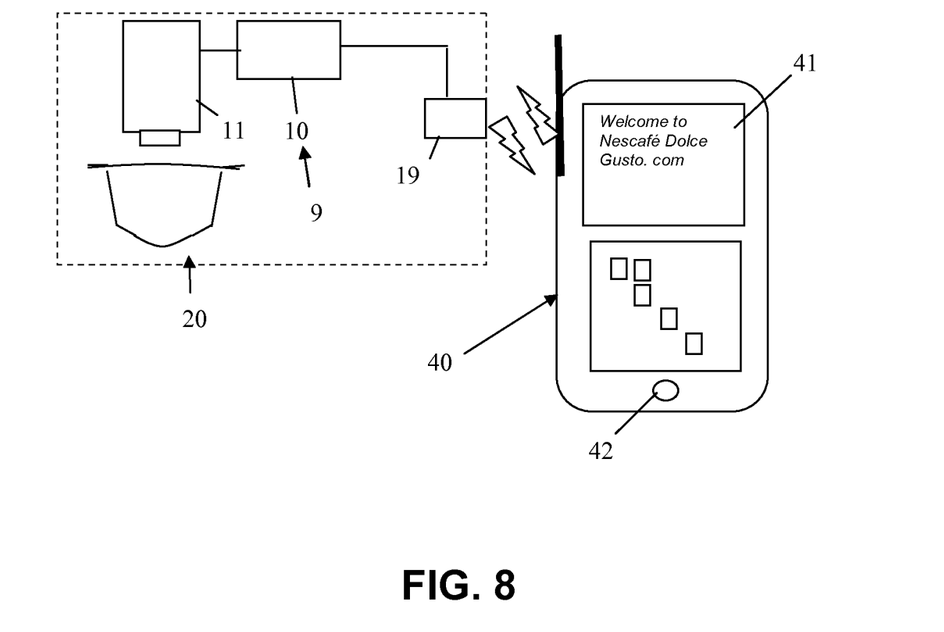
FIG. 8 illustrates a method of communication using the capsule system of the invention with a mobile telecommunication terminal.

In a possible application illustrated in FIG. 8, the beverage producing device is configured via its communication unit to communicate with a mobile telecommunication terminal 40 of the user to exchange information such as to display information on its display 41 such as product information or a link to a commercial website corresponding to the coded URL address.

Figure 9:
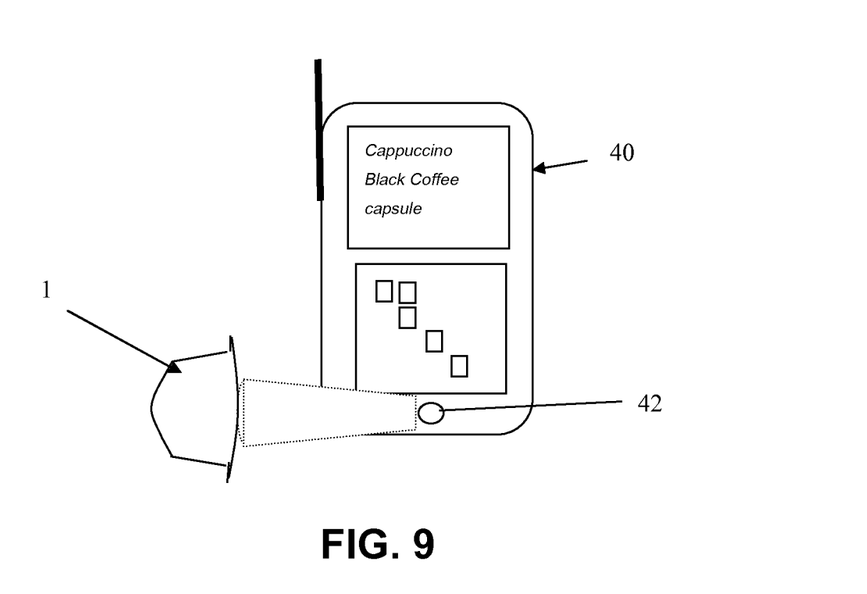
FIG. 9 illustrates the processing of the barcode on the capsule using the mobile telecommunication terminal, FIG. 10 illustrate the acquisition of information from a portable telecommunication device from an image displayed on the beverage producing device.

As illustrated in FIG. 9, the product information as well as URL contained in the code can also be read by a mobile telecommunication terminal 40 before insertion of the capsule in the beverage producing device. For this, the mobile telecommunication terminal requires a digital camera 42 and a decoding application which can be downloaded by the user onto the terminal or preloaded. The loading application is configured to read the 2-D barcode on the capsule and decode usable information therefrom. It should be noted that only certain bits of the code can be made accessible to the user as others can be confidential or useless. Thereby, algorithms or software for selecting relevant data from the code is provided in the terminal. Such algorithms or software can be downloaded as part of the decoding application. Various applications already exist to decode matrix code such as Kaywa reader and the like. Softwares can also be tailored with menus and submenus, graphics, images, movies, avatars, etc., for displaying various services in a more attractive or intuitive manner.

The invention provide the user's benefits in that he/she can obtain product information, e.g., nutritive content, product recipes, etc., such as before inserting the capsule in the beverage producing device, or access relevant websites if the terminal has an internet browser and transmitter. For instance, this straight and rapid link to websites enables to achieve a transaction such as ordering new capsules or accessories, or participate to contests, promotions, or access a client's call after sale or call centres, etc.

As other examples, recipes instructions can be displayed to the user for preparing a multi-component beverage such as a cappuccino, latte macchiato, etc, using more than one capsule.

It should also be noted that the mobile telecommunication terminal can serve to download information from a remote server and subsequently uploaded it into the control unit of the beverage producing device such as to update it on: brewing parameterization software, user's instruction software, decoding application and combinations thereof.

Figure 10:
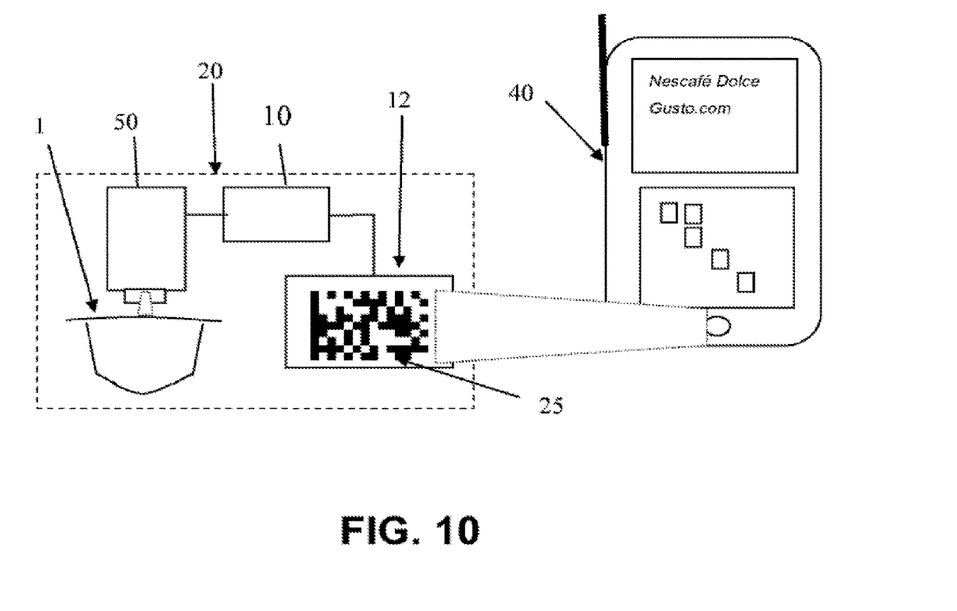

Another application of the 2-D bar-coded capsule is illustrated in FIG. 10 where the beverage producing device 20 is configured to display on its display 12, an image 50 of the 2-D barcode, as captured by its digital camera 11. The image can be a complete or partial reproduction of the 2-D barcode 7 and of the same or different size. When displayed, the barcode image 50 can be re-captured by a portable telecommunication device 40, decoded via a decoding application and processed using a suitable communication software.

Of course, the present invention is not limited to the preferred described embodiments but extends to other equivalent ones which are covered by the scope of the following claims.

The invention claimed is:

1. A method for providing information to a user from a capsule for the preparation of a beverage in a beverage producing device, the method comprising the steps of:
   inserting the capsule with a two-dimensional barcode thereon in the beverage producing device, the two-dimensional barcode provided in a circular area whose center is concentric with a center of a top membrane sealed to a flange-like rim of the capsule, containing the information, having rectilinear borders and positioned substantially on a central axis of the capsule for identifying the capsule, the circular area having a radius that is 1.5 times smaller than a radius of the top membrane;
   capturing at least one image of the two-dimensional barcode by a first digital camera without moving the first digital camera relative to the capsule and without moving the capsule relative to the first digital camera; and
   displaying decoded information from the at least one image of the two-dimensional barcode on a display.

2. The method according to claim 1, comprising displaying the decoded information on a second digital camera of a portable telecommunication terminal.

3. The method according to claim 1, wherein the display is part of the beverage producing device.

4. The method according to claim 1, wherein the display is part of a portable telecommunication terminal.

5. The method according to claim 1, wherein at least one operation consists in selecting data from a set of data contained in the decoded information before displaying further information.

6. The method according to claim 1, wherein the displayed decoded information includes product information and brewing parameters.

7. The method according to claim 1, wherein the displayed decoded information includes a web address.

8. The method according to claim 1, wherein the displayed information is an image of the decoded information.

9. The method according to claim 1, comprising displaying information that prompts the user to follow instructions relevant to the beverage preparation.

10. The method according to claim 1, comprising displaying information that prompts the user to access a website or automatically directing the user to a website.

11. The method according to claim 1, wherein the first digital camera is part of the beverage producing device.

12. The method according to claim 2, wherein the second digital camera is part of the portable telecommunication terminal.

13. The method according to claim 2, wherein only a portion of the information is accessible on the portable telecommunication terminal.

14. The method according to claim 1, wherein the top membrane is bulging outward.

15. The method according to claim 1, wherein the radius of the circular area is at least two times smaller than the radius of the top membrane.

16. The method according to claim 1, wherein the inserting of the capsule comprises positioning the capsule into an insertion zone of the beverage preparation device, the method further comprises moving, by a transport member associated with the capsule holder, the capsule from the insertion zone to an identification zone of the beverage preparation device, the barcode faces the first digital camera at a predefined distance when the capsule is in the identification zone, and the capturing of the at least one image comprises stopping the moving of the capsule.

17. The method according to claim 16, wherein the capsule holder is driven at least linearly and the capsule holder is driven at least rotationally.

\* \* \* \* \*